Patented Oct. 16, 1934

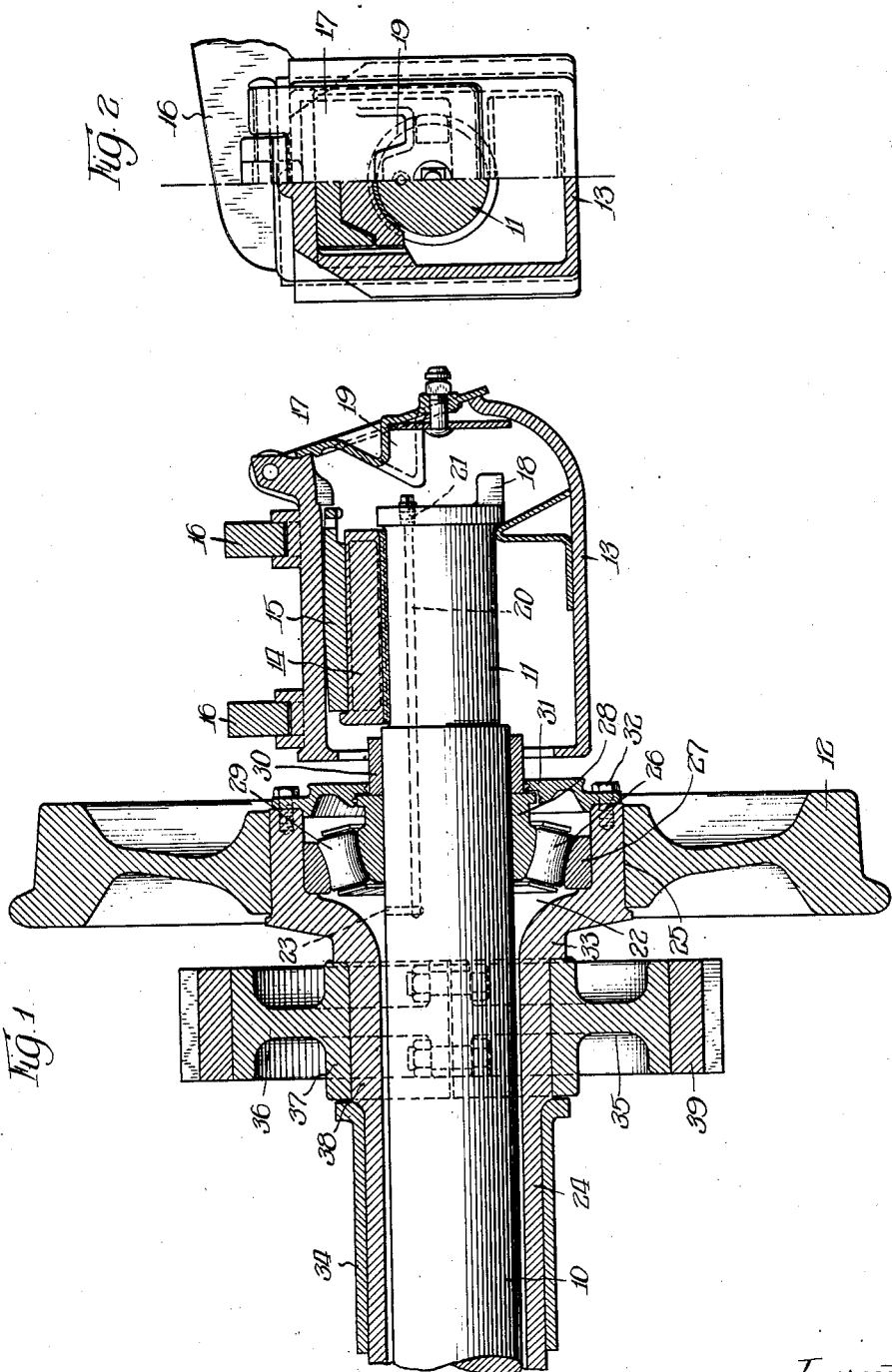

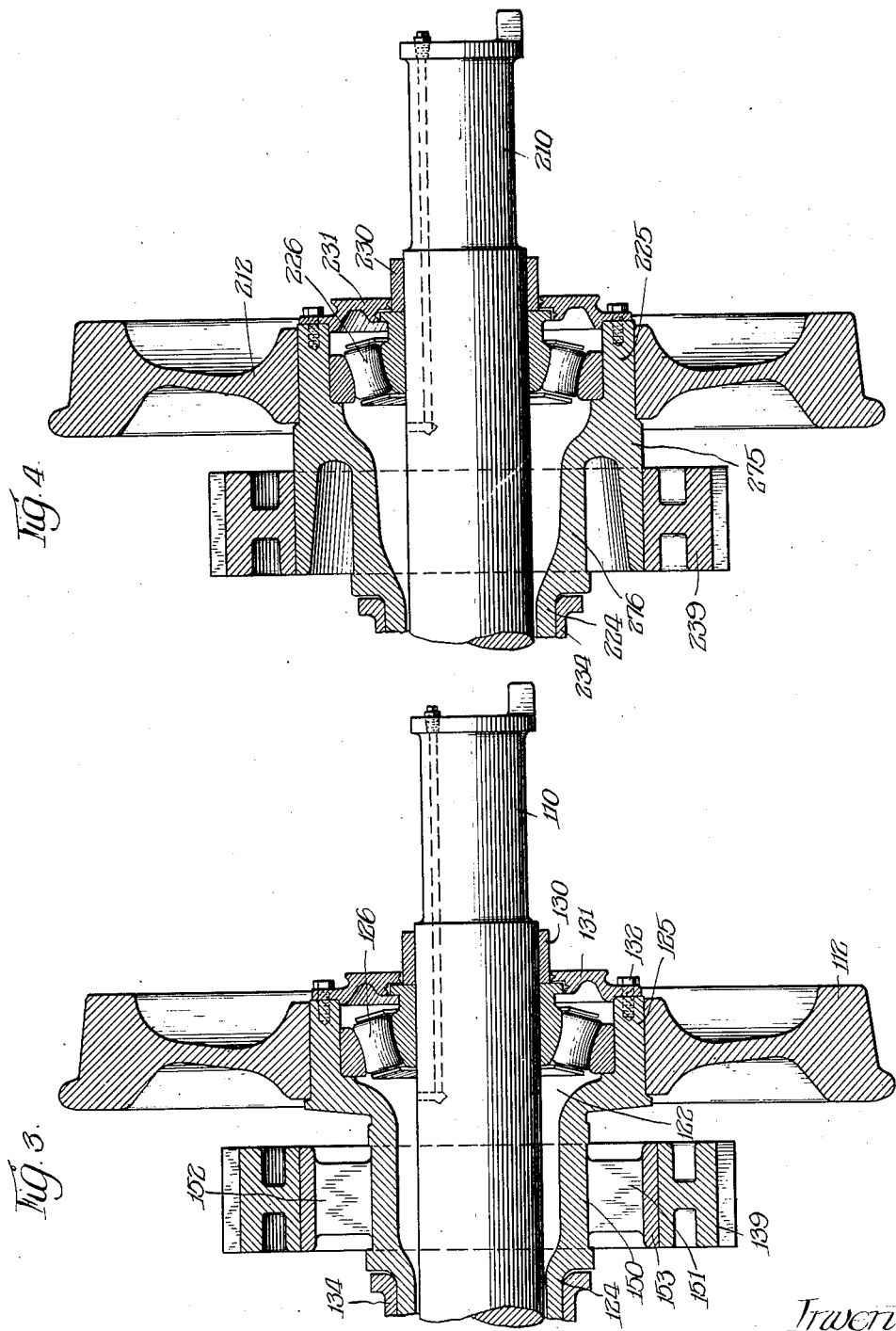

1,977,324

UNITED STATES PATENT OFFICE 1,977,324

ROLLER BEARING ASSEMBLY

Alfred H. Oelkers, Chicago, Ill., assignor to American Steel Foundries, Chicago, Ill., a corporation of New Jersey Application October 13, 1927, Serial No. 225,863

21 Claims. (Cl. 105—113)

This invention pertains to roller bearing assemblies, and more particularly to that form of roller bearing wheel and axle assemblies for motor driven trucks of rail cars.

The tendency of present day vehicles, including railway rolling stock, is to be equipped with roller bearing assemblies with the object of reducing the power necessary for starting and stopping long heavy trains, as well as to provide parts which are longer lived due to the frictional reduction. Not only is it advisable to apply these roller assemblies to trailing vehicles but it is highly desirable to use them directly on self-propelling vehicles such as oil, electrical or steam vehicles. It has been further found desirable to provide assemblies which embody inner and outer axles adapted for use with the usual standard A. R. A. journal boxes, changing the parts of the vehicle for their accommodation as little as possible. This construction lends itself particularly for adapting driving members to the axle assemblies, making it possible to place the motor in close proximity to the driving member, thereby eliminating unnecessary and undesirable parts.

It is therefore an object of this invention to provide a means for effectively transmitting the torque and tractive effort registered to rotate the driving wheels and anti-friction bearings of rail car trucks.

Another object is to provide roller bearing assemblies adaptable to standard use on existing as well as special car construction, with the least possible change in parts.

A further object is to provide a wheel and axle assembly for motor driven trucks which provides for the emergency of auxiliary rotation in the truck journal boxes if the roller bearings of the driving axle should fail.

Still further object is to provide driving gear construction for wheel and axle assemblies which is sturdy, inexpensive, readily assembled and one which fulfills all requirements of manufacture and service.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 1 is a sectional elevation through one side of a wheel and axle assembly embodying the invention;

Figure 2 is an elevation partly in section of a portion of Figure 1, showing the relation between the parts of the assembly to journal box construction;

Figure 3 is a fragmentary sectional elevation of a modified form of assembly embodying a modification of the invention; and Figure 4 is another fragmentary sectional elevation of a modified form of assembly embodying another modification of the invention.

As will be readily understood and appreciated, both sides of the wheel and axle assembly may be the same, or they may be the same with the exception of the application of the driving gear; therefore, it is thought only necessary to particularly describe the one side of the assembly embodying such driving gear.

Referring first more particularly to the modifications illustrated in Figures 1 and 2, wheel and axle assemblies, similar to those disclosed in co-pending applications Serial No. 182,734, Oelkers, filed April 11, 1927; Serial No. 184,469, Oelkers and Floyd, filed April 18, 1927, and Serial No. 211,385, Oelkers, filed August 8, 1927, include relatively stationary axle 10 terminating in a journal 11 at the end thereof which extends outwardly beyond the wheels 12 and is formed to fit in journal box 13 of the truck frame to receive the weight of the truck and car through the bearing 14. A wedge 15 may be used as a bearing pad between the bearing 14 and the journal box for the purpose of transmitting the weight from the journal box 13 to the bearing. It will be understood of course that the usual equalizer 16 may be applied to the journal box, which box is provided with a shelf form of cover 17, described in co-pending application Serial No. 184,469, above referred to.

The axle 10 may be either solid or of hollow construction and is provided at the end thereof with a projecting lug 18 adapted to engage with the shelf or lip 19 for the purpose of allowing limited rotation of said shaft as described in the copending application Serial No. 184,469. The shaft is also provided with an oil conduit 20 normally closed by a plug 21 at the outer end, the conduit extending inwardly to communicate with an oil recess 22, at 23, provided in the outer rotary axle 24. The location of this conduit is optional. It may be either formed on the same side of the center line as the plug 21, as disclosed in application Serial No. 219,849, Oelkers, filed September 16, 1927, or it may be provided on the opposite side of the center line, or in fact, any other place depending upon the problem of lubrication involved.

The outer axle 24 is in the form of a universal hub for the two wheels 12 mounted at either end thereof, by a pressed or shrunk fit, on enlarged hub portions 25 at the outer termination of the axle in way of the lubricant recess, it being understood that Timken or self-aligning or any other type of bearing 26 may be disposed between the hub portions 25 and the inner stationary axle, the bearings consisting essentially of outer and inner race rings 27 and 28 secured as by shrinking or by pressed fit to the respective outer and inner axles, the race rings having rollers 29 disposed therebetween. The race rings are positioned and maintained by a collar or ring 30 shrunk or pressed on the inner axle, and a cover plate 31 may be secured as by bolts 32 to the hub portion 25 of the outer axle for the purpose of retaining the lubricant in the recess 22, the recess being formed with a flare 33 between the axle proper and the outer hub 25.

It is highly desirable and convenient to mount the driving motor on bearing 34 carried on the tubular axle 24, which bearing is preferably located adjacent the driving gear 35. This gear consists essentially of a spider 36, illustrated as formed in sections, the same being bolted together to secure a tight and non-rotating fit with the outer axle 24, the spider and outer axle contacting along hub portions 37 and 38. The outer diameter of the spider is greater than the diameter of the hub 25 so that a one-piece gear ring 39 may be conveniently applied to and shrunk or pressed on the spider 36 after the latter is bolted into position, thereby forming a complete driving gear by which the motor rotates the driving wheels through the axle 24.

It may be well to note at this point that although this construction is the usual standard form of carrying the weight on the standard axle, it may be understood that the weight could be carried on the inner axle by mounting the truck frame more directly on the projecting ends of the stationary axle 10; that is, the truck frame may fit directly on the end of the stationary axle or the equalizers may rest directly on the ends of the axle, or a plain box or casing without special bearing or lubricant carrying means may be mounted on the ends of the axle and the equalizers will rest directly on the same. In other words, the construction illustrated is not dependent on the particular kind of journal box illustrated as this construction is readily adapted to any other form of suspension means.

Referring now more particularly to the modification illustrated in Figure 3, the parts of the device are essentially the same as already described. They include inner and outer axles 110 and 124, the latter being provided as before with the hub 125 forming the lubricant recess 122, the same being closed by the cover plate 131 bolted at 132 between the hub 125 and the positioning ring 130, the same serving to retain the bearings 126 in operating position. As before, the wheels 112 are shrunk or press fitted to the hub 125 and the motor bearing 134 is preferably adjacent an enlarged hub portion 150 on which a spider 151 may be cast, the same being preferably joined to the outer axle by means of a series of spokes 152. As before, the outer diameter of this spider is greater than the diameter of the hub 125 so that the continuous gear ring 139 may pass freely over the wheel hub and be pressed or shrunk on the rim 153 of the spider.

Referring now more particularly to the modification illustrated in Figure 4, the assembly consists essentially of the inner axle 210, the outer axle 224, motor bearing 234, the outer axle enlarged hub 225, bearings 226, positioning ring 230, cover plate 231 and wheels 212. In this case, the tubular axle adjacent the boss 225 is provided with a rim 275 extending inwardly from the wheel hub and being of a greater diameter than said hub. The free edge of this inwardly projecting rim, it will be understood, may either be entirely free with respect to the flared lubricant portion 276 of the outer axle or may be connected thereto by integral spokes as desired. With this construction, it is only necessary as before to press or shink the integral gear ring to the rim 275 after freely passing the same over the wheel hub 225.

With the constructions shown, it will be understood and readily appreciated that there has been formed a very compact and sturdy structure particularly adapted to motor driven vehicles, and it is to be understood that I do not wish to be limited by the exact modifications of the device shown, which are merely by way of illustration and not limitation, as other and various forms of the device will of course readily occur to those skilled in the art.

I claim:

1. In a wheel and axle assembly, the combination of a hollow axle member having enlarged hub portions, bearings disposed in said hub portions, wheels mounted on said hub portions and adapted to revolve with said axle member, a driving member for rotating said wheel and axle assembly, a mounting for said driving member provided on said axle member, the driving member being of a size whereby it is capable of being removed from said assembly over said hub portions.

2. In a wheel and axle assembly, the combination of a hollow axle member having enlarged hub portions forming bearing recesses, wheels mounted on said hub portions and adapted to revolve with said axle member, a driving member for rotating said wheel and axle assembly mounted on said axle member, a mounting for said driving member provided on said axle member, the driving member being so constructed that it is capable of being removed from said assembly without affecting said hub portions.

3. In a wheel and axle assembly, the combination of an axle member having a bearing for drive mechanism thereon, said axle member being provided with enlarged portions adjacent said bearing, a wheel mounted on one of said enlarged portions, and a drive member for cooperation with said drive mechanism mounted on another of said enlarged portions.

4. In a wheel and axle assembly, the combination of a rotary axle, wheels rigidly mounted thereon and adapted to rotate therewith, bearings for said axle disposed in substantially the same plane as said wheels, means rigidly mounted on said axle independently of said wheels, and a gear element rigidly mounted on said means for imparting rotation to said assembly, said gear element being so disposed and proportioned with respect to said means and said axle whereby it is capable of being removed from either end of said axle without removing said means.

5. In a wheel and axle assembly, the combination of a rotary axle having enlarged wheel receiving portions, wheels rigidly mounted thereon and adapted to rotate therewith, bearings for said axle disposed in substantially the same plane as said wheels, means rigidly mounted on said axle adjacent to and independently of said wheels, and a gear element rigidly mounted on said means for imparting rotation to said assembly, said gear element being so disposed and proportioned with respect to said means and said axle whereby it is capable of being removed from either end of said axle without removing said means.

6. In a wheel and axle assembly, the combination of an axle member having enlarged hub portions, wheels mounted on said hub portions and adapted to revolve with said axle member, one of said hub portions being provided with an annular flange, and a driving member for rotating said assembly mounted on said flange.

7. In a wheel and axle assembly, the combination of an axle member having enlarged hub portions, wheels mounted on said hub portions and adapted to revolve with said axle member, one of said hub portions being provided with an annular flange, and a driving member for rotating said assembly mounted on said flange, said driving member being so proportioned as to be capable of being removed endwise of said axle.

8. In a wheel and axle assembly, the combination of an axle member having enlarged hub portions, wheels mounted on said hub portions and adapted to revolve with said axle member, one of said hub portions being provided with an annular flange of larger diameter than said hub portion, and a driving member for rotating said assembly mounted on said flange.

9. In a wheel and axle assembly, the combination of an axle member having enlarged hub portions, wheels mounted on said hub portions and adapted to revolve with said axle member, one of said hub portions being provided with an annular flange of larger diameter than said hub portion, and a driving member for rotating said assembly mounted on said flange, said driving member being so proportioned as to be capable of being removed endwise of said axle.

10. In a wheel and axle assembly, the combination of an outer tubular axle having wheels rigidly mounted on the ends thereof for rotation therewith, an inner normally stationary axle extending through and beyond the ends of said tubular axle and being provided with bearing portions adjacent the ends thereof adapted to have cooperative engagement with journal box bearings, anti-friction bearings disposed between said axles, and means including a gear element rigidly mounted on said tubular axle, said means being adapted to have cooperative engagement with driving means for imparting rotation to said tubular axle.

11. In a wheel and axle assembly, the combination of an outer tubular axle having wheels rigidly mounted on the ends thereof for rotation therewith, an inner normally stationary axle extending through and beyond the ends of said tubular axle and being provided with bearing portions adjacent the ends thereof adapted to have cooperative engagement with journal box bearings, anti-friction bearings disposed between said axles, and means including a gear element rigidly mounted on said tubular axle adjacent one of said wheels, said means being adapted to have cooperative engagement with driving means for imparting rotation to said tubular axle.

12. In a wheel and axle assembly, the combination of an outer tubular axle having wheels rigidly mounted on the ends thereof for rotation therewith, an inner normally stationary axle extending through and beyond the ends of said tubular axle and being provided with bearing portions adjacent the ends thereof adapted to have cooperative engagement with journal box bearings, anti-friction bearings disposed between said axles, and means including a gear element rigidly mounted on said tubular axle adjacent the anti-friction bearings, said means being adapted to have cooperative engagement with driving means for imparting rotation to said tubular axle.

13. In a wheel and axle assembly, the combination of an outer tubular axle having wheels rigidly mounted on the ends thereof for rotation therewith, an inner normally stationary axle extending through and beyond the ends of said tubular axle and being provided with bearing portions adjacent the ends thereof adapted to have cooperative engagement with journal box bearings, anti-friction bearings disposed between said axles, means including a gear element rigidly mounted on said tubular axle, said means being adapted to have cooperative engagement with driving means for imparting rotation to said tubular axle, and a bearing disposed adjacent said first named means for supporting driving means.

14. In a wheel and axle assembly, the combination of an outer tubular axle having enlarged portions disposed adjacent the ends thereof, wheels mounted on said enlarged portions for rotation with said axle, an inner normally stationary axle extending through and beyond the ends of said tubular axle and being provided with bearing portions adjacent the ends thereof adapted to have cooperative engagement with journal box bearings, anti-friction bearings disposed between said axles, and means including a gear element rigidly mounted on said tubular axle adjacent one of said enlarged portions, said means being adapted to have cooperative engagement with driving means for imparting rotation to said tubular axle.

15. In a wheel and axle assembly, the combination of an outer tubular axle having enlarged portions disposed adjacent the ends thereof, wheels mounted on said enlarged portions for rotation with said axle, an inner normally stationary axle extending through and beyond the ends of said tubular axle and being provided with bearing portions adjacent the ends thereof adapted to have cooperative engagement with journal box bearings, anti-friction bearings disposed between said axles, and means including a gear element rigidly mounted on said tubular axle adjacent one of said enlarged portions, said means being adapted to have cooperative engagement with driving means for imparting rotation to said tubular axle, said gear element being so proportioned as to be removable endwise of said axle.

16. In a wheel and axle assembly, the combination of an outer tubular axle having enlarged portions disposed adjacent the ends thereof, wheels mounted on said enlarged portions for rotation with said axle, an inner normally stationary axle extending through and beyond the ends of said tubular axle and being provided with bearing portions adjacent the ends thereof adapted to have cooperative engagement with journal box bearings, anti-friction bearings disposed between said axles, and means for imparting rotation to said tubular axle, said means including a support disposed adjacent one of said enlarged portions and rigidly carried by said tubular axle and of a larger diameter than said enlarged portions, and a gear element rigidly mounted on said support and being adapted to have cooperative engagement with driving means for said assembly.

17. In a wheel and axle assembly, the combination of an outer tubular axle having enlarged portions disposed adjacent the ends thereof, wheels mounted on said enlarged portions for rotation with said axle, an inner normally stationary axle extending through and beyond the ends of said tubular axle and being provided with bearing portions adjacent the ends thereof adapted to have cooperative engagement with journal box bearings, anti-friction bearings disposed between said axles, means for imparting rotation to said tubular axle, said means including a support disposed adjacent one of said enlarged portions and rigidly carried by said tubular axle and of a larger diameter than said enlarged portions, a gear element rigidly mounted on said support and being adapted to have cooperative engagement with driving means for said assembly, and a bearing disposed adjacent said support for supporting said driving means.

18. In a wheel and axle assembly, the combination of a hollow axle, a wheel receiving portion formed on said axle, a wheel provided on said wheel receiving portion, bearings mounted in said axle, and a gear member mounted on said axle for imparting rotation to said wheel, the gear member being adapted to be removed as a unit over the wheel receiving portion.

19. In wheel and axle assemblies, the combination of a rotary axle having wheel mounting means thereon, wheels disposed thereon, a bearing disposed in the plane of one of said wheels, a spider formed integrally with said axle, and a gear mounted on said spider to transmit motion to said wheels.

20. In a wheel and axle assembly, the combination of a rotary axle, a substantially non-rotatable axle, bearings between said axles, wheels rigidly mounted on said rotary axle and adapted to rotate therewith, a spider rigidly mounted on said rotary axle independently of said wheels, and a gear element rigidly mounted on said spider for imparting rotation to said rotary axle, said gear element being so disposed and proportioned with respect to said spider and said rotary axle whereby it is capable of being removed from an end of one of said axles without removing said spider.

21. In a wheel and axle assembly, the combination of a rotary axle having enlarged wheel receiving portions, bearings therein, wheels rigidly mounted thereon and adapted to rotate therewith, a spider rigidly mounted on said axle adjacent to and independently of said wheels, and a gear element rigidly mounted on said spider for imparting rotation to said assembly, said gear element being so disposed and proportioned with respect to said spider and said axle whereby it is capable of being removed from either end of said axle without removing said spider.

ALFRED H. OELKERS.